Sept. 29, 1970   T. J. WALKER   3,531,059
LOADER, CLEANER, AND DRIER FOR FIRE HOSE
Filed Nov. 26, 1968

Inventor
Thomas J. Walker
By Charles R. Fay,
Attorney

United States Patent Office 3,531,059
Patented Sept. 29, 1970

3,531,059
LOADER, CLEANER, AND DRIER FOR FIRE HOSE
Thomas J. Walker, Wheeler Road, Ashby, Mass. 01431
Filed Nov. 26, 1968, Ser. No. 778,927
Int. Cl. B65h 75/40
U.S. Cl. 242—86.2            8 Claims

ABSTRACT OF THE DISCLOSURE

A real for winding and unwinding fire hose having a traverse guide for the hose and a hose scraper in the guide, and means to dry the hose.

BACKGROUND OF THE INVENTION

The most time and manpower consuming job of any fire department is to lay the hose back and forth in the body of the hose truck and usually requires six men. It is very tedious work and uncomfortable and difficult in bad weather.

SUMMARY OF THE INVENTION

This invention provides a power operated, traverse equipped reel which winds the hose from the front or the rear of the truck and is reverse operable to pay out or reel in. The traverse device has a hose scraper or cleaner on it so the hose is clean before it is reeled, and a hot air fan and heater device is provided to dry the hose.

PREFERRED EMBODIMENT OF THE INVENTION

Figure 1:
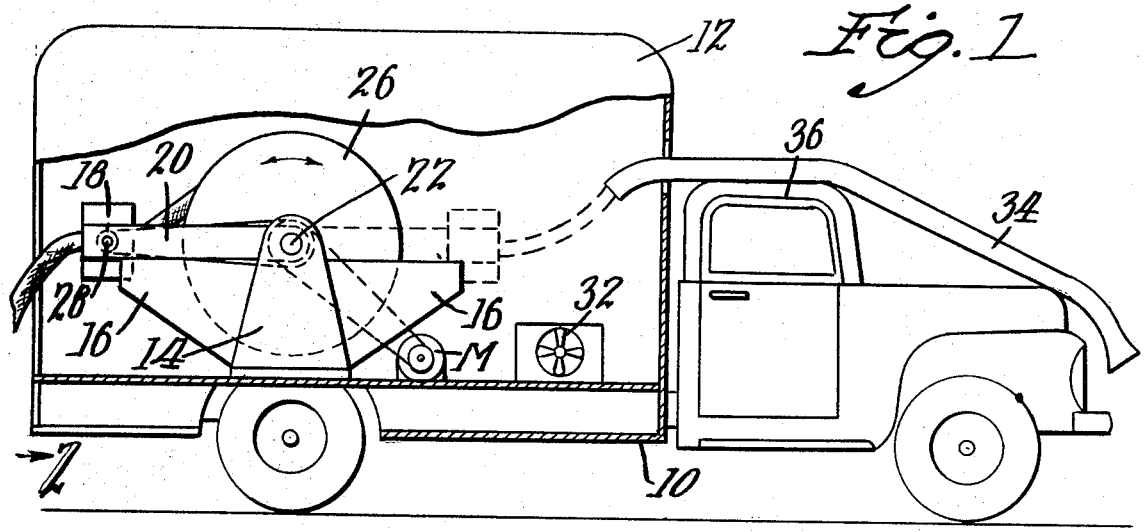
FIG. 1 is a view in side elevation showing the invention.

The character 10 indicates any kind of vehicle preferably having a van 12 to house and enclose the parts of the invention. On the floor of the van are a pair of spaced parallel upright supports 14, 14, having front and rear supporting extensions 16, 16 thereon. A support bar 18 is mounted on a pair of arms 20 swingable on a shaft 22. The arms 20 rest on either pair of extensions 16. Bar 18 extends from one support 14 to the other.

Figure 2:
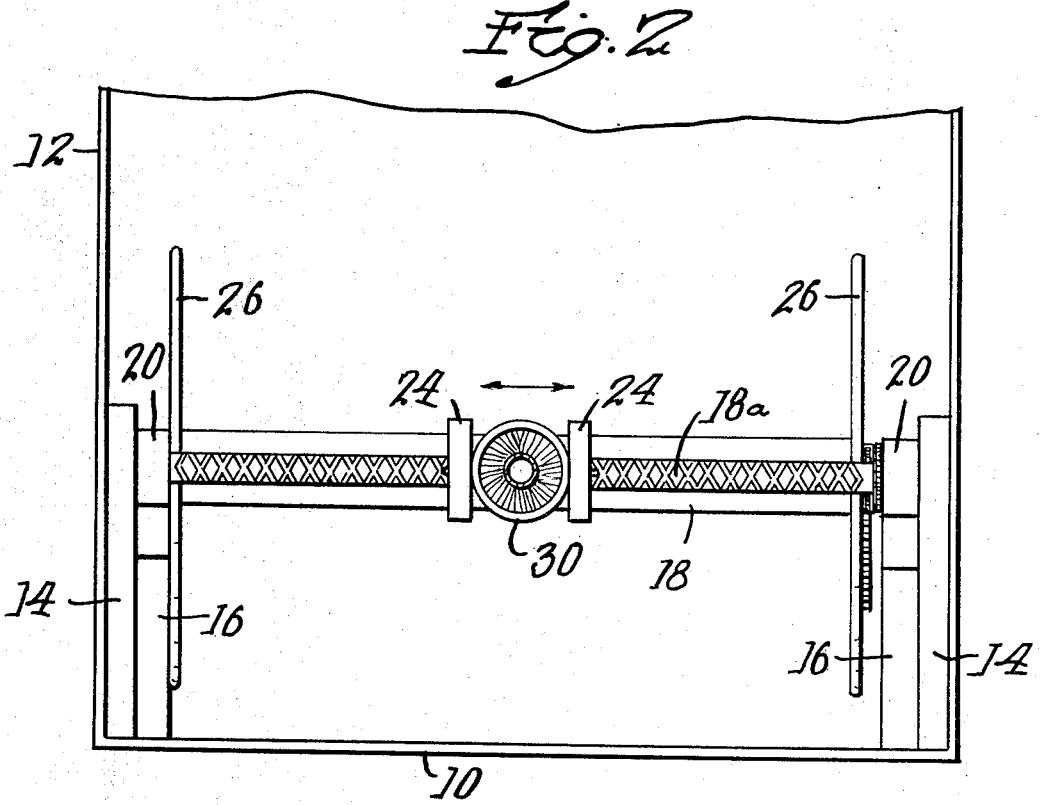
FIG. 2 is a view in rear elevation on an enlarged scale, looking in the direction of arrow 2 in FIG. 1.

The support bar is provided with a traverse mechanism 18a of well known type such as used in certain kinds of fishing reels and in many machine tools and this mechanism, when driven, causes a pair of members 24 to reciprocate in the direction of the arrows in FIG. 2 as the shaft is rotated as by a motor M or the like. The members 24 are arranged in the positions shown, sliding on support bar 18, and the traverse mechanisms may be driven by gearing not shown, from the shaft 22 at either side of the reel.

The shaft 22 is located between a pair of reel ends 26, the supports 14 and bar 18 being outside these reel ends.

Members 24 mount swivel pins 28 which swivel an eye or loop 30 between them. This eye or loop is provided with hose scraping means, e.g. bristle or the like, which extend inwardly thereof.

A forced hot air device 32 is also preferably provided to dry the hose.

The hose is threaded into the eye or loop 30 and secured to the shaft which is then driven causing the members 24 to lay the hose in regular turns onto the shaft, either from the rear of the vehicle, or as shown in dotted lines from the front of the vehicle. In the latter case, a guiding tube 34 may be provided for this purpose. The hose is automatically scraped and cleaned and will be dried by the forced air device.

The motor M and the device 32 can be controlled from the cab 36 and the motor M could be dispensed with if proper gearing from the vehicle drive shaft were to be used.

The mechanism can be driven in either direction so that hose can be payed out as well as wound on the reel, and this allows the vehicle driver alone to lay the hose on the ground, as at a fire. He merely places the hose nozzle where wanted and then drives to a water source, etc., while mechanically paying out the hose. Also, he can wind the hose and clean it by himself if necessary.

This invention does away with the most manpower and time consuming job of any fire department, which is that of laying hose back and force in the hose truck. This is a tedious job for six men especially in bad weather. The reel also liminates kinking, and at most two men will be needed to operate it. The reel and the traverse mechanism may be as large and heavy as may be needed.

I claim:

1. A hose reel, means to rotate the reel for winding hose thereon, a traverse device including a hose guiding eye associated with the reel for laying the hose evenly onto the reel said guiding eye including hose cleaning means located in the eye for contacting and cleaning the hose as it is drawn through the eye.

2. The hose reel of claim 1 wherein the reel is capable of rotation in either direction for paying out hose as well as reeling it in.

3. The hose reel of claim 1 including a housing for the reel and hose drying means in the housing.

4. The hose reel of claim 1 including a housing for the reel and hose drying means in the housing, said housing and reel being mobile.

5. The hose reel of claim 1, said traverse device being pivotally mounted for swinging movement to either side of the reel.

6. The hose reel of claim 1 including a housing for the reel and hose drying means in the housing, and a guiding tube mounted to direct the hose into the housing.

7. The hose reel of claim 1 including a housing for the reel and hose drying means in the housing, and a guiding tube mounted to direct the hose into the housing, said housing being a van on a truck, and the guiding tube being in a position to guide the hose from the front of the truck into the housing.

8. The hose reel of claim 3 said traverse device being pivotally mounted for swinging movement to either side of the reel and said housing being a van on a truck, the hose being reeled in or payed out at the front or selectively at the rear of the truck.

References Cited

UNITED STATES PATENTS

| | | | |
|---|---|---|---|
| 491,821 | 2/1893 | Taber | 242—86 XR |
| 2,301,208 | 11/1942 | Gear | 242—86 |
| 2,595,655 | 5/1952 | Hannay | 242—86 |
| 2,692,092 | 10/1954 | Kinsinger | 242—86.5 |
| 2,718,376 | 9/1955 | Raney | 15—104.3 XR |
| 2,909,794 | 10/1959 | McGraw et al. | 15—88 XR |
| 3,394,730 | 7/1968 | Sherman | 242—158 XR |
| 3,471,885 | 10/1969 | McLoughlin et al. | 242—86 XR |

FOREIGN PATENTS 125,424    11/1947    Australia.

STANLEY N. GILREATH, Primary Examiner

W. H. SCHROEDER, Assistant Examiner

U.S. Cl. X.R.

15—88, 104.3; 242—86.5, 158.3